July 10, 1962 | H. N. FRIHART ET AL | 3,044,016

REMOTE CONTROL SYSTEM

Filed June 23, 1958 | 3 Sheets-Sheet 1

INVENTORS
Henry Neil Frihart
James J. Krakora Jr.
BY Mueller & Aichele
Attys.

INVENTORS.
Henry Neil Frihart
James J. Krakora Jr.
BY Mueller & Aichele
Attys.

INVENTORS
Henry Neil Frihart
James J. Krakora Jr.
BY Mueller & Aichele
Attys.

3,044,016

REMOTE CONTROL SYSTEM

Henry Neil Frihart, La Grange, and James J. Krakora, Jr., Chicago, Ill., assignors to Motorola, Inc., Chicago, Ill., a corporation of Illinois Filed June 23, 1958, Ser. No. 743,792
4 Claims. (Cl. 325—392)

This invention relates to remote control systems and more particularly to an improved and simplified remote control system using radiated signal energy to perform one or more control functions.

One of the more widespread uses for remote control systems is in the adjustment of present day television receivers since a television viewer generally sits beyond covenient reach of the receiver, and remote control apparatus can provide the necessary adjustments from the viewer's position. Remote control apparatus of this kind should be of a "wireless" type and of comparatively simple and low cost construction in order to be readily saleable with television receivers. On the other hand, the controls available with such apparatus should be powerful enough to operate properly over distances encountered in television control situations and should be sufficiently selective to the control signal to avoid false operation due to spurious signals. While sound energy has been used in the prior art for receiver remote control purposes, the systems have not been altogether satisfactory for the purposes outlined due to the lack of simplified control of the functions to be remotely performed, and the overall complexity and cost of multi-function systems rendering such systems relatively expensive and unreliable in use.

An object of the present invention is to provide an improved and simplified remote control system utilizing sonic energy as the control medium.

Another object is to provide a remote control television receiver using a control unit of small size but yet of sufficient power for reliable operation over television viewing distances.

Another object is to provide a remote control system for television receivers which system is simple and convenient to operation for rapidly and accurately performing a plurality of television receiver control functions.

A still further object is to provide a multi-function remote control system which exhibits improved discrimination between desired control signals and spurious signals.

A feature of the invention is the provision of a small, unitary control transmitter providing different continuous supersonic signals and a control receiver responsive to reception of such signals for controlling electromechanical devices to operate controls such as the tuning or volume controls of a television receiver.

Another feature is the provision of an improved miniature, transistorized supersonic oscillator having control switches for connecting different frequency determining elements into the oscillator circuit for generating control signals of different frequencies.

A further feature is the provision of such a transistorized oscillator utilizing hollow, magnetostrictive rods through which feedback signals for the oscillator are maintained, and an air coupling disc supported on each rod having a diameter substantially equal to a multiple of the signal wave length thereby maximizing energy coupling from the transmitter.

A further feature is the provision of a sensitive receiver for supersonic signals having a plurality of detector sections each responsive to a control signal of particular frequency and duration to operate relay control circuits and an automatic gain control system connected to a detector section and amplifier in the receiver for more reliable response of the receiver upon variation in the level of an input control signal.

A still further feature of the invention is the provision of a multi-function control system utilizing a supersonic control signal to perform a function selecting operation at the control receiver associated with a television receiver and a further supersonic control signal to operate a controlling circuit for the function selected, with such selected function being shown by illuminated indicators associated with the television receiver.

Further objects, features and the attending advantages of the invention will be apparent upon consideration of the following description when taken in conjunction with the accompanying drawings in which.

In a preferred form of the invention, there is provided a remote control system particularly adapted for adjusting a television receiver channel selector mechanism, the on-off switch of the receiver, or the level of the receiver volume all from a remote viewing position. The remote transmitter is a small unit suitable to be held in the hand of an operator and it incorporates a transistorized oscillator. The oscillator frequency is controlled by feedback through one or more magnetostrictive rods and a radiating diaphragm is supported by each rod for coupling energy to the air and maximizing sound energy transfer at the particular magnetostrictive frequency of the rod. Switch means in the transmitter provide selection of which of a plurality of oscillator frequencies is transmitted. The remote control receiver includes suitable sound pick-up and amplifying apparatus plus a multi-section detector, with one section responsive to each control signal frequency. Electric motor controls are operated by the detector sections. A gain control potential is developed by the detector and applied to the input amplifier of the receiver to improve the response of the detector sections with variable signal level and permit maximum gain with low input signals. For deenergizing the entire system including the remote control receiver, a rack for storing the transmitter unit when it is not in use includes a master switch held open by the transmitter unit when cradled therein. A modified emodiment of the system employs a stepping relay responsive to one signal at the remote control receiver for function selection and an operating relay responsive to another signal at the receiver for operating a control circuit of the function mechanism selected. Suitable indicators on the television receiver then afford a visual indication of the function which has been selected.

Figures 1, 2, 3:
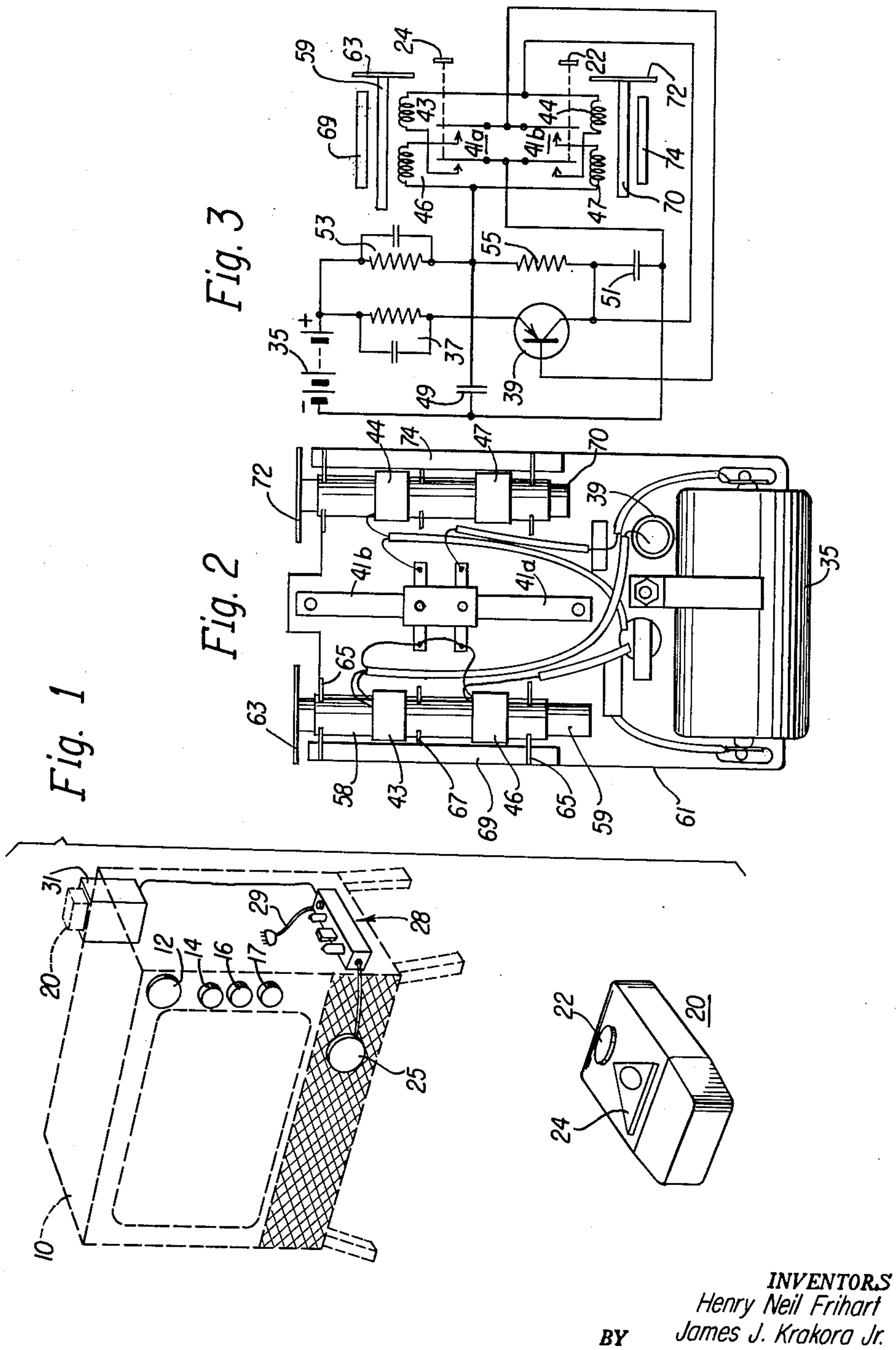
FIG. 1 is a perspective view showing the remote control transmitter and receiver as they may be used in conjunction with the television receiver.
FIG. 2 is a view of the chassis of the remote control transmitter of the invention.
FIG. 3 is a schematic diagram of the remote control transmitter circuit.

In FIG. 1 the television receiver 10 includes a channel selector knob 12, a volume and on-off switch control 14 as well as contrast and brightness controls 16 and 17. The remote control transmitter unit 20, which may be of a size small enough to be conveniently carried in the hand of a user, includes transmitter energizing switches 22 and 24, operation of which provides respectively in the associated television receiver an on-off control and channel selection. When energized, the transmitter 20 emits supersonic radiation from the end thereof adjacent push-button switch 22 and this energy is received by transducer 25 located behind the speaker grill of the television receiver 10. Transducer 25 is connected to a remote control receiver unit 28 which provides control potentials in response to the transmitted supersonic energy and these potentials are used to operate the controls of the receiver 10, as will be explained subsequently. The receiver unit 28 includes a cable 29 for connection to the television receiver circuit.

On the back panel of the television receiver a cradle 31 is supported in a position to conveniently receive the transmitter unit 20 when the television receiver is not in use.

FIGS. 2 and 3 show respectively the physical arrangement of certain of the transmitter components and a diagram of the circuit of the transmitter. The positive terminal of battery 35 is connected through the bypassed bias network 37 to the emitter of transistor 39. The base electrode of transistor 39 is connected to portions of switch sections **41*a* and 41*b* which are operated respectively by push-buttons 24 and 22. Further portions of switch sections 41*a* adn 41*b* are connected to the negative terminal of battery 35. The collector of transistor 39 is connected to both inductance coil 43 and inductance coil 44. The other terminals of these coils are connected to fixed portions of switch sections 41*a* and 41*b* which are adapted to be coupled to the negative terminal of the battery when either switch section is operated. A terminal of each feedback coil 46 and 47 is bypassed to B— through the capacitor 49 and the other terminals of these coils are connected to fixed portions of switch sections 41*a* and 41*b* so that either coil may be connected to the base of transistor 39 when the associated switch section is operated. Capacitor 51 is connected between the collector of the transistor and the negative terminal of battery 35 so that this capacitor is across either coil 43 or coil 44** when a switch section is operated and this capacitor serves to tune the coils when so connected.

The base of transistor 39 is biased through the bypassed bias network 53 which is connected between the positive terminal battery 35 and the interconnection of coils 46 and 47, either of which will provide a D.C. path to the base when a switch section is operated. A stabilizing resistor 55 is also connected to the junction of coils 46, 47 and the collector of transistor 39.

As shown in FIG. 2 coils 43 and 46 are supported on a cylindrical coil form 58 within which is positioned a hollow rod 59 composed of nickel which is highly magnetostrictive. The rod acts as a megnetostriction transducer which supplies a feedback path between the coils in the transistor oscillator circuit for sustaining oscillation at the mechanical resonant frequency of the rod. On the end of the rod facing outwardly of the transmitter chassis 61 there is supported a circular aluminum diaphragm 63 which provides air coupling for radiation of ultrasonic vibrations produced by longitudinal oscillation of rod 59. The coil form 58 is supported at the ends thereof by supports 65 and the coil and rod assembly is supported at the center thereof by the support 67, where there is essentially a null area so that the support 67 has practically no effect on the magnetostrictive action. The coil form 58 does not adversely affect the rod action since the motion of the rod is along its longitudinal axis.

In close proximity to rod 59 and parallel thereto there is positioned a permanent magnet 69 which has its poles at the ends, in order to provide a magnetic bias for rod 59. The bias is stronger than the induced field from one half of the oscillation signal and the bias flux density is about 60% of the saturation value of the rod. This prevents the transducer from doubling the frequency of the oscillator signal. This frequency doubling would occur without the magnetic bias due to the fact that the transducer is insensitive to the polarity of the driving wave form, the change in length being in the same direction regardless of the polarity of the oscillator signal.

The particular length of rod 59 is selected so that the magnetostrictive action thereof peaks at a frequency of 38.5 kilocycles and the feedback between coils 43 and 46 in the oscillator circuit is provided through the megnetostrictive action of this rod which thus determines the frequency of oscillator operation. The proper length for a particular frequency is determined from the frequency length constant for the magnetostrictive material in use. This material should have a low temperature coefficient to minimize frequency shift with temperature change. The circular diaphragm 63 has a diameter equal to one half of the wave length at which the oscillation takes place and this maximizes the flexing of this radiator and thus increases the transfer of energy from the rod into the air as a diaphragm is flexed by longitudinal oscillation of rod 59. The diaphragm should be light in weight to reduce damping of the rod. Rod 59 is made hollow to reduce eddy current losses therein.

In a transmitter of practical construction, the transducer formed by the rod 59, its radiator diaphragm and the inductance coils was construction as follows:

| | | |
|---|---|---|
| Signal frequency | 38.5 kilocycles or 41.5 kilocycles. | |
| Material of rod 59 | Nickel type "A". | |
| | 38.5 kc. | 41.5 kc. |
| Rod length | 2.31" | 2.06" |
| Rod diameter | .250" | .250" |
| Rod wall thickness | .013" | .013" |
| Material of diaphram 63 | Aluminum | |
| Diaphragm diameter | .720" | |
| Diaphragm thickness | .018" | |
| Spacing of inductance | .562" | |
| Coils 43, 46, 44, 47 | 5 mh. each | |

As is apparent in FIG. 2, the battery 35 is supported at the portion of chassis 61 which is held in the palm of the hand of a user of the device and switch sections **41*a*, 41*b* are disposed in the center and forward of the position of the battery. Pushbuttons 24 and 22 are thus conveniently available for operation of either switch section. The magnetostrictive rod 59, diaphragm 63 and biasing magnet 69 together with coils 43 and 46 form a transducer which is positioned on one side of the switch sections and magnetostrictive rod 70 together with its associated diaphragm 72 and biasing permanent magnet 74 are positioned on the other side of the switch sections. The particular construction of the transducer employing rod 70 corresponds in detail to that employing rod 59 except that the length is shorter so that oscillation takes place at 41.5 kilocycles. Accordingly, operation of button 22 will connect the battery and transducer to the oscillator circuit to produce a supersonic signal of 41.5 kilocycles which is used to turn the television receiver on or off, and operation of pushbutton 24 will similarly connect the battery and other transducer to cause a supersonic signal of 38.5 kilocycles to be produced, which serves to operate the channel changing mechanism in the television receiver 10**.

Figure 4:
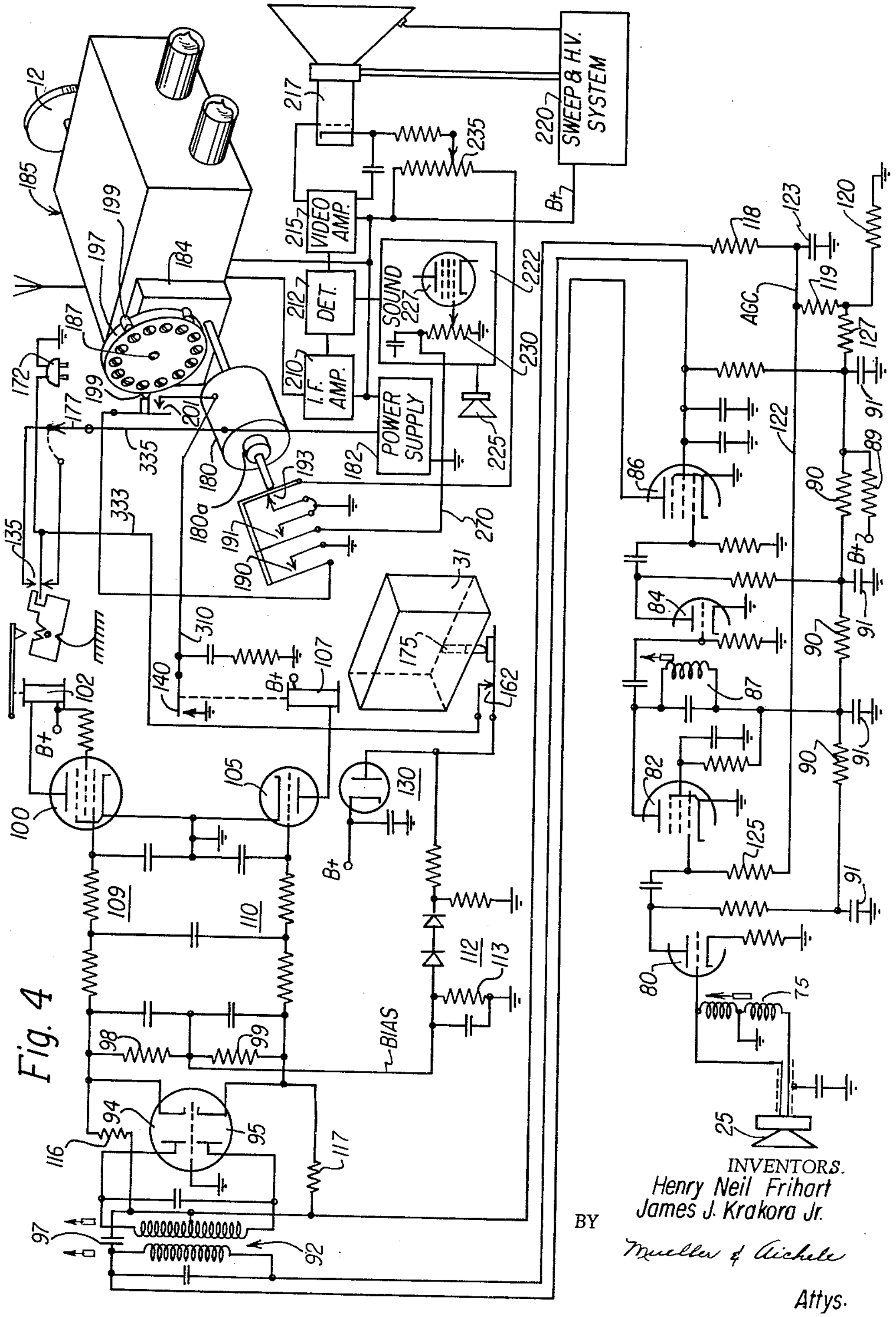
FIG. 4 is a diagram, partly schematic and partly in block form, showing the remote control receiver as used with a television receiver.

FIG. 4 shows a receiver circuit for the remote control system. The supersonic energy is received by means of a transducer or crystal microphone 25 which develops an electrical signal amplified by the triode amplifier tube 80. Advantage may be taken of the mechanical resonance of the microphone, which is made to occur on one side of 40 kc., and high Q coil 75 which can tune the microphone capacity to the other side of 40 kc. to get a desired frequency and amplitude response to the control signals. The signal is further applied to a pentode amplifier tube 82 and a triode amplifier tube 84 and a further pentode amplifier tube 86. The parallel LC network 87 in the anode circuit of tube 82 is tuned broadly in the region of the signal frequencies employed, or approximately 40 kilocycles. The anode circuits for triodes 80, 84 and pentodes 82, 86 are connected to B+ through resistor 89 and suitable signal decoupling means, including resistors 90 and capacitors 91. This circuit reduces the tendency for feedback among the four high gain amplifier stages which are all operating at the same signal frequency. Evenly balancing the gain per stage also aids in reducing feedback as does the AGC system described below. The anode circuit of pentode 86 is connected to the primary winding of transformer 92, which is tuned to 40 kilocycles, i.e., midway between the frequencies of the two control signals.

The secondary winding of transformer 92 is also tuned to 40 kilocycles and the end terminals of this secondary winding are connected to the anodes of diode sections 94, 95. The anode side of the primary winding of transformer 92 is coupled through capacitor 97 to a center tap of the secondary winding and a suitable resistor-capacitor network is connected to the diode cathodes thus connecting the diode sections 94, 95 in a phase shift discriminator circuit. Both primary and secondary tuned circuits are high Q to improve response of the discriminator.

Accordingly, when a signal of 41.5 kilocycles is received the conduction of diode section 94 is increased with respect to the conduction of diode section 95 so that the cathode of diode section 94 is driven in a positive direction and this increase in potential is applied to the control grid of the pentode control tube 100 to increase its conduction and cause operation of the on-off control relay 102. This relay is of the bistable or latching type.

Similarly, when the signal of 38.5 kilocycles is received, triode control tube 105 increases in conduction sufficiently to cause energization of channel selecting relay 107. The cathode of diode section 94 is connected to the pentode control tube 100 through an integrating network 109 and the cathode of diode section 95 is connected through integrating network 110 to the triode control tube 105. These integrating networks tend to prevent operation of the control tubes by spurious signals of short duration and the networks have time constants long with respect to the duration of the spurious signals and long enough that the control signals from the remote control transmitter must be received for a certain minimum period of time before the control tubes will operate.

A rectifier circuit 112, which is energized from the same alternating current power supply operating the remainder of the television receiver and the remote control receiver, provides a negative bias with respect to ground across resistor 113 and this is applied to the interconnection of the diode load resistors 98 and 99. These resistors are both direct current connected to the respective control grids of tubes 100 and 105, the cathodes of which tubes are grounded so that the tubes may be biased to conductive conditions such that the relays 102 and 107 do not become energized by the general background noise signals which may be translated by the remote control receiving system.

At the center tap of the secondary winding of transformer 92 there is developed a voltage, negative with respect to ground, when the conduction condition of the two diode sections is unbalanced. This potential is developed when diode section 94 increases conduction with respect to section 95 due to the current flow through resistor 116 which is connected between the center tap of the transformer secondary winding and the cathode of diode section 94. Similarly, the voltage is produced by current flow in resistor 117 when diode section 95 increases conduction. This potential so developed appears across the series connection of resistors 118, 119, 120, 113 and 98 or 99. The values of these resistors are so proportioned that a portion of this potential is developed at the junction of resistors 118 and 119 and applied to the AGC lead 122. This lead is bypassed to ground for signal frequencies through capacitor 123 and the potential thereon is applied through the grid resistor 125 to the control grid of pentode amplifier tube 82. The cathode of this tube is connected to ground. The AGC lead 122 is also connected through resistor 119 to the junction of resistors 120 and 127 which are series coupled between ground and resistor 89 which is connected to B+. The voltage divider formed by resistors 120, 127 and 89 is proportioned so that the positive potential applied thereby to AGC lead 122 is balanced with respect to the negative bias potential from resistor 113, which is applied to lead 122 through resistors 98 and 116 (and resistors 99, 117) and 118 so that a suitable AGC delay voltage is produced on lead 122. The delay voltage is made large enough to offset the bias from resistor 113 and to prevent the formation of an AGC voltage when weak signals are applied to the discriminator circuit. However, at stronger signal levels the AGC voltage will overcome the delay voltage and the gain of tube 82 will be reduced thereby tending to maintain a uniform amplitude of input signals to the discriminator circuit. This gain control further compensates for variation in input signal levels due to variation of transmitter to receiver distance and helps to maintain signal level within the receiver below that tending to cause feedback among the several stages all operative at the same frequency. It is desirable that the AGC be "stiff" enough that no limiting of signals occurs in the amplifier stages (tubes 82, 84, 86) in order to reduce the harmonic content of signals applied to the signal detecting circuit. This is of particular importance in connection with the circuit of FIG. 5, which will be explained subsequently.

Rectifier circuit 130 provides B+ for the remote control receiver and this rectifier circuit is connected through switch contacts 162 to one terminal of a power line plug 172. The other terminal of plug 172 is grounded. A control member 175 supported in the bottom of cradle 31 is engageable with the movable contact of switch 162 so that the switch contacts are opened when the transmitter unit 20 is stored in cradle 31. This serves the purpose of deenergizing rectifier circuits 112 and 130 so that the remote control receiver is inoperative. When the transmitter unit 20 is removed from the cradle 31 switch 162 is closed and this automatically prepares the remote control receiver unit for operation.

The arm of relay 102 is engageable with a spring biased rocker which moves the arm of SPDT switch 135, the fixed contacts of which are connected to fixed contacts of the manually operated on-off switch 177. The movable arm of switch 135 is connected to one terminal of the line plug 172 and the movable arm of switch 177 is connected to the tuning control motor 180 and the power supply 182 for the television receiver. Switch 177 is controllable from the front panel of the receiver and the arm of switch 135 is, of course, controlled by the remote control receiver so that the television receiving system may be turned on or off by either the remote control transmitter or the manual switch on the receiver cabinet. Switch 177 may be conveniently controlled by means of the volume control knob 14.

As shown in FIG. 4, the television tuner 185 may be adjusted to a desired channel by means of manual control knob 12 or by means of the motor 180. The contacts 140 operated by relay winding 107 are used to complete the power circuit from plug 172 to the motor 180. Motor 180 may drive suitable gear reduction apparatus 184 so that the control shaft 187 is operated at approximately 24 r.p.m. Motor 180 includes an armature 180*a* which is of the declutching type and moves inwardly upon energization of the unit to close the switch contacts 190 and 191 and to open the switch contacts 193. Shaft 187 carries an index wheel 197 having a series of adjustable cams 199 about the periphery thereof. Each channel to which the tuner 185 may be adjusted is associated with one of the cams 199. A switch 201 is positioned adjacent the periphery of the index wheel 197 and each cam 199 may be set to engage and open switch 201 as the index wheel rotates, or to pass by the switch without opening it. The cams are adjustable and may be locked in an engaging or nonengaging position. Switch 201 is series connected between the motor and one contact of switch 190, the remaining contact of which is grounded.

In tuning a channel by remote control, the motor 180 is started when the relay 107 is energized and index wheel 197 will rotate moving an index cam 199 out of engagement with the operating arm of switch 201. At this time, index 190 will also be closed as the declutching rotor 180*a* pulls in. Therefore, the energizing circuit for the motor control 180 is completed through switches 201 and 190 and an operator of the remote control transmitter may release the channel selector button 24 (which causes release of relay contacts 140). The apparatus continues to operate until an index cam 199 engages switch 201 to deenergize the motor 180 and at this time the tuner 185 will be adjusted to the channel associated with the outwardly projecting cam which first engages switch 201 after the remote transmitter station selector button has been released.

FIG. 4 also shows in block form the further circuits of the television receiver including an intermediate frequency amplifier 210, a detector 212 and a video amplifier 215. Signals from the video amplifier are applied to the cathode ray tube 217 for reproduction of the television image. The video amplifier 215 is also connected to the sweep and high voltage system 220 providing scanning signals and the high voltage screen potential for the tube 217. The detector circuit 212 is further connected to a sound system 222 which operates a loudspeaker 225. The sound system includes an audio amplifier tube 227 with the control grid thereof connected to the moveable arm of a volume control 230. The contacts 191 operated by energization of the motor 180 are connected across the potentiometer 230 so that when the tuning apparatus is motor driven, the sound signal is short circuted to silence the receiver.

The power supply circuit 182 is connected to each of the receiver portions as well as to one side of the brightness control potentiometer 235. The other side of potentiometer 235 is normally grounded through the contacts 193. The arm of this potentiometer is coupled to the cathode of the cathode ray tube 217 so that adjustment thereof will vary the beam current and thus the brightness of the television image. However, when the declutching motor 180*a* has pulled in, the brightness control will be disconnected and cathode ray tube 217 will be rendered nonconductive so that the television picture is effectively blanked out during the automatic tuning operation.

Figure 5:
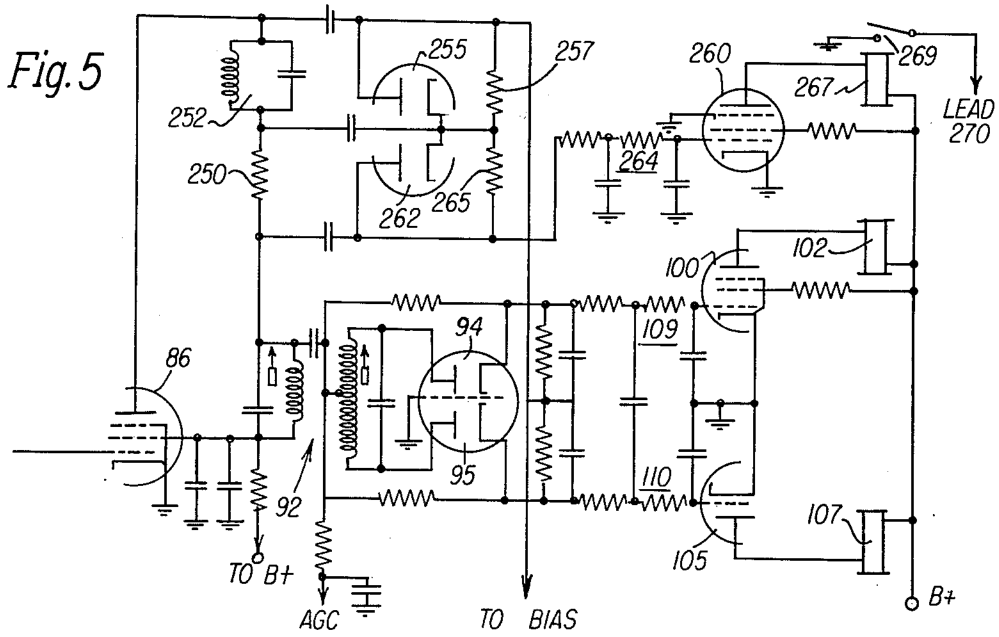
FIG. 5 shows a portion of the circuit of FIG. 4 with a modified remote control receiver detector circuit.

FIG. 5 shows a modification of the remote control receiver circuit for use in a system using control signals of three different supersonic frequencies. The transmitter 20 would be modified to provide the necessary three signals instead of two. In this receiver circuit the components corresponding to those of the circuit of FIG. 4 are given the same reference characters. The circuit operates as described previously to control the triode 105 and the pentode 100 in response to signals to which the discriminator is tuned. For the third control function the anode circuit of tube 86 further includes resistor 250, series connected with a tuned circuit 252 between the primary of transformer 92 and B-plus. Tuned circuit 252 is tuned to the center frequency of the discriminator circuit (here 40 kc.) and the energy developed therein will be rectified by diode 255 and to develop a voltage across resistor 257 with a polarity tending to cause increase conduction of control tube 260. Similarly the signals in a broad band, including spurious noise signals and the like, developed across resistor 250 are rectified by diode 262 and to develop a potential across resistor 265 tending to decrease the conduction of control tube 260. Therefore, this portion of the circuit operates as a differential detector. The differential signal output of this detector is applied to tube 260 through a D.C. path in the integrating network 264 which functions like networks 109, 110.

As previously pointed out it is desirable that the AGC prevent limiting in other stages of the receiver to reduce the harmonic content of the signal which might otherwise tend to cause false response by energization of tuned circuit 252. The AGC potential is developed by the discriminator circuit, as described previously, due to conduction of both diodes 94, 95 in the case of a signal at center frequency.

The anode of control tube 260 is coupled to B+ through relay 267 so that when a signal is translated by the receiver which has a frequency to which tuned circuit 252 is resonant, the conduction of tube 260 will increase and cause energization of relay 267. The negative bias potential developed by rectifier circuit 112, and appearing across resistor 113, is applied to the interconnection cf resistor 257 and the anode of diode 255 and this potential is applied through resistors 257 and 265 and the integrating network 264 to the control grid of tube 260. This bias maintains the conduction of tube 260 at a level below the pull-in current of the relay tube 267 so that this relay is operated only when the signal developed by tuned circuit 252 exceeds the signal developed by resistor 250 by an amount such that the output of the differential detector causes the required increased conduction of tube 260.

The contacts 269 of relay 267 are connected between ground and lead 270 in the receiver circuit of FIG. 4. This lead is connected to the top side of the volume control 230, the bottom side of which is connected to ground so that the sound portion of the television receiver may be silenced in response to operation of relay 267.

Figure 6:
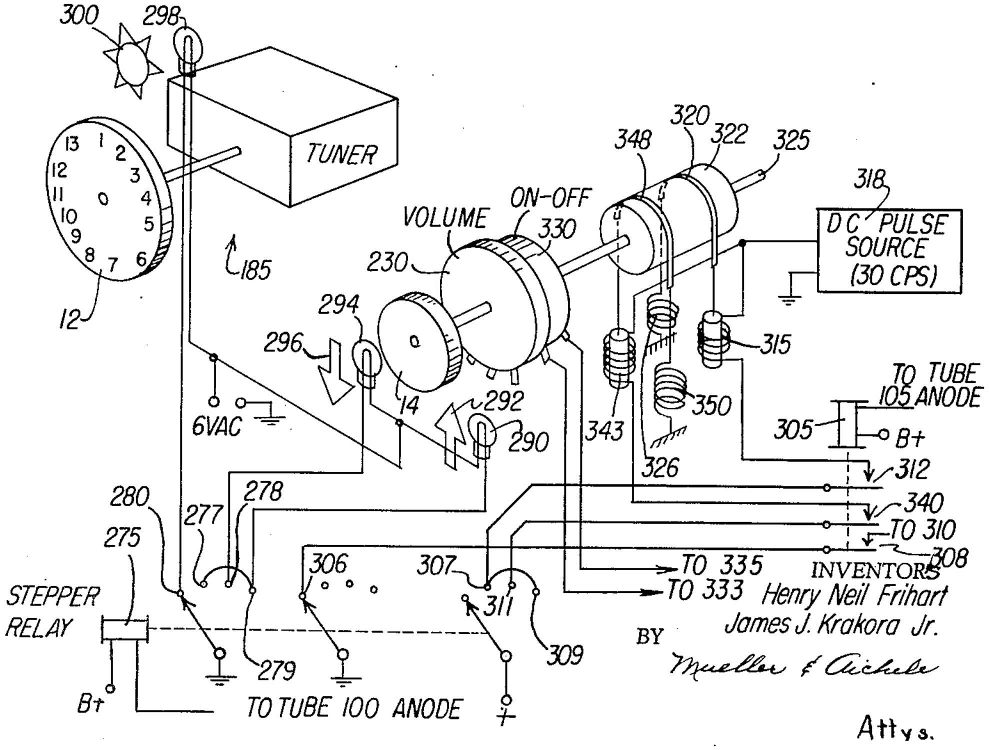
FIG. 6 shows a further modification of the system of FIG. 4 in which the remote control apparatus performs control functions in a different manner.

The circuit of FIG. 6 is a modification of the system of FIG. 4 in order to permit selection of a remote control function in response to one supersonic signal and operation of the selected control in response to the other supersonic signal. In this form, relay 275 (substituted for relay 102) is operated by increase in conduction of tube 100 so that as long as the signal of 41.5 kilocycles is translated in the remote receiver, the switch arms will sequentially establish the contacts shown. Contacts 277 and 279 are connected to one terminal of a pilot lamp 290, the other terminal of which is connected to a low voltage A.C. source to energize the same. When the pilot light 290 is lighted it illuminates an indicator arrow 292 which points upward to indicate that the receiver is conditioned to raise the volume control setting of the television receiver. Similarly, contact 278 is connected to pilot lamp 294 which illuminates a downwardly pointing indicator arrow 296 to show that the remote control receiver is conditioned to lower the volume control setting. Contact 280 is connected to pilot lamp 298 which illuminates indicator 300 to show that the system is prepared to control the setting of tuner 185.

It may be noted that there are two contacts, namely, contacts 277 and 279 which condition the system for raising the volume controlled setting and that these contacts are established before and after the closing of contact 278 which conditions the receiver to lower the volume control setting. This would permit the user of the system to operate relay 275 to a position for lowering the volume control setting immediately after the setting thereof had been raised, that is, immediately after contact 277 had been established, or it would permit raising of the volume immediately after it had been lowered, by establishing contact 279 after contact 278 has been established. Therefore, it would be unnecessary to advance the step-up relay setting more than one contact in order to effect a volume change in case the volume had been lowered or increased too much with the contacts 277 or 278 established.

Relay 305 (substituted for relay 107) is energized by sufficient conduction of tube 105 which operates in response to translation of the signal of 38.5 kilocycles in the receiver. When energized, this relay closes contacts 308 which are connected between contacts 306 of the stepper relay 275 and lead 310 which is connected to the control motor 180. Therefore, when it is desired to change channels, the proper control signal is transmitted to operate relay 275 until contacts 280 and 306 are established, at which time the indicator 300 will be lighted and the control signal may be stopped. Then the second control signal is transmitted to operate relay 305 and energize the tuner motor, by grounding lead 310, until the desired channel has been selected.

In order to raise the volume control setting, relay 275 is operated until either contacts 277 or 279 are grounded in order to cause illumination of indicator arrow 292. Then the control signal to operate relay 305 is transmitted to close contacts 312 which are connected between contacts 307 and 309 and solenoid 315. This solenoid is also connected to a direct current pulse source 318 which provides a signal to alternately energize and deenergize solenoid 315. This solenoid is mechanically joined to the strap 320 which encircles a friction drum 322 rotatable with the volume control shaft 325. The other end of strap 320 is connected to spring 326. Accordingly, when contacts 312, and 307 or 309 are closed, the solenoid 315 will alternately pull and release strap 320 which will frictionally drive drum 322 in a clockwise direction. Rotation of this type will increase the setting of volume control 230. Such rotation can also operate on-off switch 330 which is ganged to the volume control 230 if this switch were previously off. Switch 330 may be the conventional on-off switch operative at the extreme low volume setting of the volume control and is connected between leads 333 and 335 in the circuit of FIG. 4. Thus, switch 330 controls the application of power from the line plug 172 to the control motor 180 and the power supply 182. Obviously, switches 135 and 177 would be omitted and power to the remote control receiver would still be regulated by contacts 162 which are opened to deenergize the receiver when the remote control transmitter is positioned in cradle 31.

To lower the volume control setting, or to turn the television receiver off, contact 278 of the stepper relay 275 is established by the control signal which causes increased conduction of tube 100 thereby illuminating the indicator 296. Contacts 340 of relay 305 are series connected between contact 311 and solenoid 343, the remaining terminal of which is connected to the pulse source 318. Thus, when relay 305 is energized by reception of the control signal which increases the conduction of tube 105, a pulse signal is applied to solenoid 343 to draw strap 348 against spring 350 and cause clockwise rotation of the drum 322 and shaft 325.

In the system of FIG. 6 it may be noted that an electromechanical drive for the volume control of the television receiver also performs the power on-off control of the receiver, thus providing continuous control of the volume as well as on-off control. While the remote control system requires only two supersonic signals there are a plurality of functions which may be performed since one of the signals is used for the function selection and the other signal is used for function performance. Furthermore, the function which has been selected will be clearly apparent to a user of the system since there are illuminated indicators for that purpose.

The invention thus provides a remote control system utilizing a miniaturized, unitary, continuous tone transmitter producing a frequency controlled supersonic signal having a relatively high power output for operation over television viewing distances. The remote control receiver is a multi-stage highly sensitive circuit including means for guarding against false response to spurious noise signals which may be introduced into a control system of this type. Furthermore, the receiver includes a gain control provision for improved operation as the signal transfer from the transmitter to the receiver varies with the transmitter used at different distances from the receiver. The described system also includes apparatus for simple and convenient remote adjustment of all of the controls which are normally operated in the tuning of a television receiver for viewing and listening purposes.

We claim:

1. In a remote control system operating by means of signal energy radiated in space, a receiver for signal energy of different frequencies, including means for receiving the signal energy in space to provide a signal, amplifier means for translating the signal, said amplifier means being subject to gain reduction by application of a control potential thereto, detector means coupled to said amplifier means and including discriminator means tuned to two of the different frequencies and a differential portion tuned to the remaining frequency to provide an output voltage in response to a signal of one of such frequencies, means for applying the output voltage to said amplifier means as a gain control potential therefor, control circuit means adapted to be energized by a voltage to perform a control function, and an integrator network coupled between said detector means and said control circuit means for applying the output voltage thereto, said integrator network having a time constant long with respect to spurious signals in the receiver, whereby performance of the control function is effected upon reception for a period in excess of the time constant of said integrator network.

2. In a remote control system operating by means of signal energy radiated in space, a receiver for signal energy of two different frequencies, including means for receiving the signal energy in space to provide a signal, amplifier means for translating the signal, said amplifier means being subject to gain reduction by application of a control potential thereto, detector means coupled to said amplifier means to provide a first output voltage in response to the signal of one frequency and a second output voltage in response to a signal of the other frequency, means for applying said output voltages to said amplifier means as a gain control potential therefor, stepping switch means responsive to the first output voltage and having first, second and third contacts sequentially established upon operation thereof, control relay means responsive to the second output voltage and having a plurality of contacts, power supply means, motor drive means energizable in first and second modes for driving a control in opposite senses, circuit means intercoupling said first and third contacts of said stepping switch means and said power supply means and said motor drive means and contacts of said control relay means for energizing said motor drive means in the first mode in response to the second output voltage with said circuit means established by said stepping switch means, and further circuit means interconnecting said second contacts of said stepping switch means, and said power supply means and said motor drive means and further contacts of said control relay means for energizing said motor drive means in the second mode in response to the first output voltage with said further circuit means established by said stepping switch means.

3. In a remote control system operating by means of signal energy radiated in space, a remote control for controling a combined volume control and on-off switch for a wave signal receiver and receiver for signal energy of two different frequencies, including means for receiving the signal energy in space to provide a signal, amplifier means for translating the signal, detector means coupled to said amplifier means to provide a first output voltage in response to the signal of one frequency and a second output voltage in response to a signal of the other frequency, stepping switch means responsive to the first output voltage and having first, second and third contacts sequentially established upon operation thereof, control relay means responsive to the second output voltage and having a plurality of contacts, power supply means, motor drive means energizable in first and second modes for driving the volume control and on-off switch in opposite directions, circuit means intercoupling said first and third contacts of said stepping switch means and said power supply means and said motor drive means and contacts of said control relay means for lowering the volume control setting in response to the second output voltage with said circuit means established by contacts of said stepping switch means, and further circuit means interconnecting said second contacts of said stepping switch means and said power supply means and said motor driving means and further contacts of said control relay means for increasing the volume control setting in response to the first output voltage with said further circuit means established by contacts of said stepping switch means.

4. A remote control system using signal energy of two different frequencies for controlling a motor operated channel selector and an audio signal translating circuit of a television receiver, said system including means for receiving the signal energy to provide a signal, amplifier means for translating the signal, detector means coupled to said amplifier means to be controlled by the signal therefrom and to provide a first output voltage in response to a signal of one frequency and a second output voltage in response to a signal of another frequency, circuit means for reducing the responsiveness of said amplifier and detector means to reception of further signal energy upon the production of an output voltage therefrom, stepping switch means responsive to the first output voltage and having a plurality of contacts sequentially established upon operation thereof, control relay means responsive to the second output voltage, an audio control circuit connected to the audio signal translating circuit and including first and second circuit means, said first circuit means being connected to one of said contacts for establishing an increased audio level from the television receiver, said second circuit means being connected to another of said contacts for establishing a decreased audio level from the television receiver and including complete muting of the audio from the receiver by shunting of the audio signal translating circuit, third circuit means including an on-off energizing switch for the television receiver operative in selected positions of said stepping switch means, and said control relay means having contacts connected in circuit with the motor for the channel selector and being operable in a selected condition of said stepping switch means for energizing the motor so that the television receiver is operative on a selected channel in response to the second output voltage whereby the signal energy of two different frequencies provides increased and decreased audio level control, on and off control and channel selector motor control in the television receiver.

References Cited in the file of this patent

UNITED STATES PATENTS

| | | |
|---|---|---|
| 1,005,338 | Shoemaker | Oct. 10, 1911 |
| 1,587,512 | Dornig | June 8, 1926 |
| 1,917,881 | Germanton | July 11, 1933 |
| 2,257,272 | Miller | Sept. 30, 1941 |
| 2,520,621 | Beers | Aug. 29, 1950 |
| 2,549,825 | Labin | Apr. 24, 1951 |
| 2,817,025 | Adler | Dec. 17, 1957 |
| 2,930,955 | Bourget et al. | Mar. 29, 1960 |
| 2,935,731 | Richter | May 3, 1960 |